(12) United States Patent
Nakahashi (10) Patent No.: US 10,593,440 B2
(45) Date of Patent: Mar. 17, 2020

(54) INSULATED ELECTRIC WIRE

(71) Applicant: Hitachi Metals, Ltd., Tokyo (JP)

(72) Inventor: Masanobu Nakahashi, Tokyo (JP)

(73) Assignee: HITACHI METALS, LTD., Tokyo (JP)

(*) Notice: Subject to any disclaimer, the term of this patent is extended or adjusted under 35 U.S.C. 154(b) by 0 days.

(21) Appl. No.: 16/146,555

(22) Filed: Sep. 28, 2018

(65) Prior Publication Data

US 2019/0304620 A1    Oct. 3, 2019

(30) Foreign Application Priority Data

Apr. 3, 2018 (JP) ................................. 2018-071349

(51) Int. Cl.

| | |
|---|---|
| *H01B 7/295* | (2006.01) |
| *H01B 3/44* | (2006.01) |
| *C08L 23/16* | (2006.01) |
| *C08L 23/08* | (2006.01) |
| *H01B 7/29* | (2006.01) |

(Continued)

(52) U.S. Cl.
CPC .......... *H01B 3/445* (2013.01); *C08F 214/265* (2013.01); *C08K 3/2279* (2013.01); *C08L 23/06* (2013.01); *C08L 23/0815* (2013.01); *C08L 23/16* (2013.01); *C08L 27/18* (2013.01); *H01B 7/292* (2013.01); *H01B 7/295* (2013.01)

(58) Field of Classification Search
CPC ...................................................... H01B 7/295
USPC .......................................... 174/110 R, 121 A
See application file for complete search history.

(56) References Cited

U.S. PATENT DOCUMENTS

| | | | | |
|---|---|---|---|---|
| 2007/0261879 | A1* | 11/2007 | Mussig | ............... C08K 3/22 174/121 A |
| 2014/0069685 | A1* | 3/2014 | Nakahashi | ........... C08L 27/18 174/110 SR |
| 2017/0166528 | A1* | 6/2017 | Peters | ............... C07D 209/34 |

FOREIGN PATENT DOCUMENTS

| | | |
|---|---|---|
| JP | 2013-004264 A | 1/2013 |
| JP | 2013-062259 A | 4/2013 |

(Continued)

OTHER PUBLICATIONS

Japanese Office Action, dated Dec. 14, 2018, in Japanese Application No. 2018-071349 and English Translation thereof.

(Continued)

*Primary Examiner* — Chau N Nguyen
(74) *Attorney, Agent, or Firm* — McGinn I.P. Law Group, PLLC.

(57) ABSTRACT

An insulated electric wire is composed of a conductor, and an insulating layer disposed around an outer circumference of the conductor. The insulating layer is formed from a fluorine-containing elastomer composition, and the fluorine-containing elastomer composition includes a base polymer (A) including 70% by mass or more and 98% by mass or less of a copolymer (a1) of tetrafluoroethylene and an α-olefin having 2 to 4 carbon atoms, and 2% by mass or more and 30% by mass or less of an ethylene-ethyl acrylate copolymer (a2) (excluding an ethylene-ethyl acrylate-maleic anhydride ternary copolymer), and a flame retardant (B) including an antimony compound (b1) and a bromine-based flame retardant (b2), and including 1 part by mass or more and 9 parts by mass or less of the antimony compound (b1), and 0.3 parts by mass or more and 15 parts by mass or less of the bromine-based flame retardant (b2) per 100 parts by mass of the base polymer (A).

17 Claims, 1 Drawing Sheet

(51) Int. Cl.
*C08K 3/22* (2006.01)
*C08F 214/26* (2006.01)
*C08L 23/06* (2006.01)
*C08L 27/18* (2006.01)

(56) References Cited

FOREIGN PATENT DOCUMENTS

| JP | 2013-161572 A | 8/2013 |
| JP | 2014-006969 A | 1/2014 |

OTHER PUBLICATIONS

Japanese Office Action, dated Sep. 21, 2018, in Japanese Application No. 2018-071349 and English Translation thereof.

* cited by examiner

INSULATED ELECTRIC WIRE

The present application is based on Japanese patent application No. 2018-071349 filed on Apr. 3, 2018, the entire contents of which are incorporated herein by reference.

BACKGROUND OF THE INVENTION

1. Field of the Invention

The present invention relates to an insulated electric wire.

2. Description of the Related Art

Flame retardancy is required for insulated electric wires used for rolling stocks, automobiles, etc. from the viewpoint of safety in case of fire. In addition, as the performance of rolling stocks and automobiles is improved, the environmental temperature at which insulated electric wires are used tends to increase, so that heat resistance is required so that the insulated electric wire will not deteriorate even if it is left in a high-temperature environment for a long period of time.

In order to satisfy such characteristics, a fluorine-containing elastomer is used as a material for forming an insulating layer provided in the insulated electric wire. The fluorine-containing elastomer is, for example, a copolymer of tetrafluoroethylene and an α-olefin, and is known as a material excellent in heat resistance, flame retardancy, mechanical properties, oil resistance, chemical resistance, electrical properties, and the like. On the other hand, since the fluorine-containing elastomer is generally an expensive material, its range of use may be limited in terms of price.

Therefore, in order to lower the cost, the fluorine-containing elastomer may be used as a fluorine-containing elastomer composition blended with a polyolefin, an inorganic filler or the like, which is inexpensive as compared with a fluorine-containing elastomer (for example, refer to JP-A-2014-6969). In JP-A-2014-6969, the fluorine-containing elastomer composition includes, for example, a low-density polyethylene (LLDPE), a high-density polyethylene (HDPE), an ethylene-ethyl acrylate copolymer (EEA), or the like as a polyolefin in a fluorine—including elastomer, so that the fluorine-containing elastomer content in the base polymer is lowered. Then, in order to improve the flame retardancy, a flame retardant is added. As a result, it is possible to achieve cost reduction while satisfying the required characteristics.

SUMMARY OF THE INVENTION

However, in the technique of JP-A-2014-6969, the blending of the low-density polyethylene, the high-density polyethylene or the like impairs the inherent properties of the fluorine-containing elastomer, resulting in difficulty in satisfying the heat resistant temperature at the high level of the 200 degrees C. level inherent in the fluorine-containing elastomer.

The present invention has been made in view of the above problems, and it is an object of the present invention to provide an insulated electric wire which is superior in mechanical properties, flame retardancy and heat resistance and which is less expensive than an insulated electric wire using a fluorine-containing elastomer composition in which its base polymer consists only of a fluorine-containing elastomer.

According to one aspect of the invention, an insulated electric wire, comprises:
a conductor; and
an insulating layer disposed around an outer circumference of the conductor,
in which the insulating layer is formed from a fluorine-containing elastomer composition, and the fluorine-containing elastomer composition includes a base polymer (A) including 70% by mass or more and 98% by mass or less of a copolymer (a1) of tetrafluoroethylene and an α-olefin having 2 to 4 carbon atoms, and 2% by mass or more and 30% by mass or less of an ethylene-ethyl acrylate copolymer (a2) (excluding an ethylene-ethyl acrylate-maleic anhydride ternary copolymer), and a flame retardant (B) including an antimony compound (b1) and a bromine-based flame retardant (b2), and including 1 part by mass or more and 9 parts by mass or less of the antimony compound (b1), and 0.3 parts by mass or more and 15 parts by mass or less of the bromine-based flame retardant (b2) per 100 parts by mass of the base polymer (A).

Points of the Invention

According to the present invention, it is possible to provide the insulated electric wire which is superior in mechanical properties, flame retardancy and heat resistance and which is less expensive than an insulated electric wire using a fluorine-containing elastomer composition in which the base polymer consists of only a fluorine-containing elastomer.

DETAILED DESCRIPTION OF THE PREFERRED EMBODIMENTS

One Embodiment of the Present Invention

One embodiment of the present invention will be described below.

Incidentally, herein, the numerical range expressed by using "to" means a range including numerical values described before and after "to" as a lower limit value and an upper limit value.

[Fluorine-Containing Elastomer. Composition]

Figure 1:
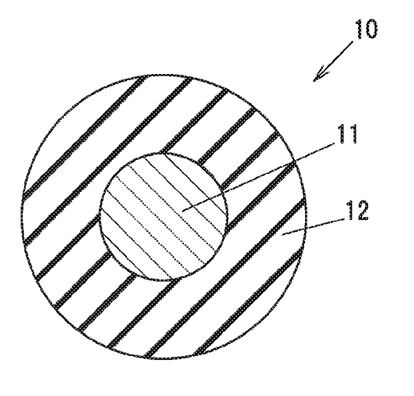
FIG. 1 is a cross-sectional view perpendicular to a longitudinal direction of an insulated electric wire according to one embodiment of the present invention.

First, a fluorine-containing elastomer composition used for an insulated electric wire 10 of the present embodiment will be described. The insulated electric wire 10 includes a conductor 11 and an insulating layer 12.

The fluorine-containing elastomer composition used for the insulated electric wire of the present embodiment includes a base polymer (A) including a copolymer (a1) of tetrafluoroethylene and an α-olefin having 2 to 4 carbon atoms and an ethylene-ethyl acrylate copolymer (a2), and a flame retardant (B) including an antimony compound (b1) and a bromine-based flame retardant (b2).

(Base Polymer (A))

Herein, the base polymer means a polymer component and a rubber component included in the fluorine-containing elastomer composition. The base polymer (A) includes a copolymer (a1) of tetrafluoroethylene and an α-olefin having 2 to 4 carbon atoms and an ethylene-ethyl acrylate copolymer (a2).

(Copolymer (a1) of Tetrafluoroethylene and an α-Olefin Having 2 to 4 Carbon Atoms)

The copolymer (a1) of tetrafluoroethylene and an α-olefin having 2 to 4 carbon atoms (hereinafter also referred to simply as component (a1)) corresponds to a fluorine-containing elastomer and is a component excellent in heat resistance, flame retardancy, mechanical properties, oil resistance, chemical resistance, electrical properties, and the like.

In the component (a1), the α-olefin having 2 to 4 carbon atoms is not particularly limited as long as it is copolymerized with tetrafluoroethylene to exhibit elastomer properties, but propylene or butene-1 may be used alone or a combination of two or more of ethylene, propylene, butene-1 and isobutene can be used. Of these, propylene is preferred from the viewpoint of improving the heat resistance and flame retardancy of an insulating layer 12. That is, as the component (a1), a tetrafluoroethylene-propylene copolymer is preferable. From the viewpoint of the heat resistance and moldability of the fluorine-containing elastomer composition, the tetrafluoroethylene-propylene copolymer preferably has tetrafluoroethylene and propylene at a molar ratio in the range of 95:5 to 30:70, and more preferably in the range of 90:10 to 45:55.

As long as the component (a1) is mainly composed of tetrafluoroethylene and an α-olefin having 2 to 4 carbon atoms, the component (a1) may further include a copolymerizable component with these. As such a component, it is possible to use, for example, ethylene, isobutylene, acrylic acid and its alkyl ester, vinyl fluoride, vinylidene fluoride, hexafluoropropene, chloroethyl vinyl ether, chlorotrifluoroethylene, perfluoroalkyl vinyl ether, or the like. The content of these components may be within a range that does not impair the properties of the component (a1), it is preferably 50 mol % or less, more preferably 30 mol % or less, for example.

The number average molecular weight of the component (a1) is not particularly limited, but when it is too low, since the mechanical strength of the insulating layer 12 may be lowered, the number average molecular weight is preferably 20,000 or more. On the other hand, if the number average molecular weight is too high, the extrusion moldability of the fluorine-containing elastomer composition decreases and cracks may occur in the insulating layer 12. Therefore, the number average molecular weight is preferably 200,000 or less. In other words, by setting the number average molecular weight at in the range from 20,000 to 200,000, the occurrence of cracks in the insulating layer 12 can be suppressed and the mechanical strength can be improved. Incidentally, the adjustment of the number average molecular weight can be carried out by a method of directly adjusting a molecular weight of a polymer produced by operating such copolymerization reaction conditions as monomer concentration, polymerization initiator concentration, monomer to polymerization initiator amount ratio, polymerization temperature, use of a chain transfer agent, etc., or by a method of producing a high molecular weight copolymer at the time of copolymerization reaction and heating it in the presence of oxygen to reduce the molecular weight.

(Ethylene-Ethyl Acrylate Copolymer (a2))

In the present embodiment, an ethylene-ethyl acrylate copolymer (a2) (hereinafter also referred to simply as component (a2)) is used in order to reduce the proportion of the component (a1) in the fluorine-containing elastomer composition. Incidentally, in the component (a2), the ratio of each of ethylene and ethyl acrylate is not particularly limited, but may be appropriately changed.

In the case of using the ethylene-ethyl acrylate-maleic anhydride ternary copolymer, maleic anhydride has high polarity and reactivity, so it has adhesiveness, leading to the problem that the wires stick to each other immediately after extrusion molding. Therefore, in the fluorine-containing elastomer composition, no ethylene-ethyl acrylate-maleic anhydride ternary copolymer is included.

Incidentally, in the base polymer (A), a polymer component other than the components (a1) and (a2) described above may be blended within a range not impairing various properties of the fluorine-containing elastomer composition. As such a polymer component, for example, an ethylene-vinyl acetate copolymer or the like can be mentioned.

(Flame Retardant (B))

Since the component (a2) has lower flame retardancy than the component (a1), in the present embodiment, the flame retardant (B) is added to the fluorine-containing elastomer composition for the purpose of complementing a decrease in flame retardancy accompanying a decrease in the proportion of the component (a1) and further improving the flame retardancy. Then, at least the antimony compound (b1) and the bromine-based retardant (b2) are used as the flame retardant (B). For example, as in the case of using only the bromine-based retardant (b2), when using one type alone, it is necessary to blend it in large amounts in order to obtain high flame retardancy. However, if only one type is blended in a large amount, although the flame retardancy of the fluorine-containing elastomer composition can be improved, the heat resistance is greatly impaired. In this respect, by using the antimony compound (b1) and the bromine-based flame retardant (b2) in combination, it is possible to reduce the respective compounding amounts, and it is possible to improve the flame retardancy without significantly impairing the heat resistance.

The antimony compound (b1) (hereinafter also simply referred to as "component (b1)") generates gas during burning of the insulating layer 12 to shut off oxygen and suppresses burning, thereby improving the flame retardancy of the insulating layer 12. As the antimony compound, antimony oxides such as diantimony trioxide, diantimony tetraoxide, diantimony pentoxide, sodium antimonate and the like can be used. Among them, diantimony trioxide (hereinafter referred to as antimony trioxide) is preferable.

The bromine-based flame retardant (b 2) (hereinafter also simply referred to as "component (b 2)") improves the flame retardancy of the insulating layer 12 by suppressing burning reaction by radical trap during burning of the insulating layer 12. As the bromine-based flame retardant (b2), it is possible to use a known compound, for example ethylene bis (pentabromobenzene), ethylene bispentabromobenzene, tetrabromobisphenol A-bis (2,3-dibromopropyl ether), decabromodiphenyl oxide, octabromodiphenyl oxide, pentabromodiphenyl oxide, tetrabromobisphenol A, tetrabromobisphenol A-bis (allyl ether), tetrabromobisphenol A-bis (2-hydroxyether), hexabromocyclo decant, bis (tribromophenoxy) ethane, tetrabromobisphenol A epoxy oligomer, tetrabromobisphenol A carbonate oligomer, ethylene bis tetrabromophthalimide, poly-dibromophenylene oxide, 2,4,6-tribromophenol, tetrabromobisphenol A-bis (acrylate), tetrabromophthalic anhydride, tetrabromophthalate diol, 2,3-dibromopropanol, tribromostyrene, tetrabromophenyl maleimide, poly (pentabromobenzyl) acrylate, tris (tribromoneopentyl) phosphate, tris (dibromphenyl) phosphate, tris (tribromophenyl) phosphate and the like can be used. One of these may be used alone, or two or more of them may be used in combination. Among these, ethylene bis (pentabromobenzene) is particularly preferable from the viewpoint of safety.

(Composition)

The fluorine-containing elastomer composition includes the above-mentioned components in the following compounding ratios.

The base polymer (A) includes 70% by mass or more and 98% by mass or less of a copolymer (a1) of tetrafluoroethylene and an α-olefin having 2 to 4 carbon atoms, and 2% by mass or more and 30% by mass or less of an ethylene-ethyl acrylate copolymer (a2). When the compounding amount of the component (a2) is less than 2% by mass, the proportion of the component (a1) in the fluorine-containing elastomer composition cannot be reduced and the cost cannot be sufficiently reduced. On the other hand, if the component (a2) is compounded in an amount of more than 30% by mass, it is difficult to obtain a high level of mechanical properties, heat resistance and flame retardancy in a well-balanced manner in the fluorine-containing elastomer composition.

Incidentally, the base polymer (A) preferably includes 70% by mass or more and 90% by mass or less of a copolymer (a1) of tetrafluoroethylene and an α-olefin having 2 to 4 carbon atoms, and 10% by mass or more and 30% by mass or less of an ethylene-ethyl acrylate copolymer (a2).

The flame retardant (B) includes 1 part by mass or more and 9 parts by mass or less of an antimony compound (hi), and 0.3 parts by mass or more and 15 parts by mass or less of a bromine-based retardant (b2), with respect to 100 parts by mass of the base polymer (A). If the blending amount of either of the components (b1) and (b2) is less than the specified ranges, no sufficient flame retardancy can be obtained in the insulating layer 12. On the other hand, if the blending amount of either of the components (b1) and (b2) exceeds the specified ranges, although the flame retardancy can be obtained in the insulating layer 12, the heat resistance is lowered.

That is, by setting the blending amount of each component at within the above-mentioned ranges, it is possible to satisfy the mechanical properties, the heat resistance and the flame retardancy at the high level in the insulating layer 12 while suppressing the cost of the fluorine-containing elastomer composition.

Incidentally, the antimony compound (b1) content is preferably 3 parts by mass or more and 9 parts by mass or less, and more preferably 3 parts by mass or more and 7 parts by mass or less with respect to 100 parts by mass of the base polymer (A). The bromine-based flame retardant (b2) content is preferably 5 parts by mass or more and 15 parts by mass or less, and more preferably 5 parts by mass or more and 10 parts by mass or less with respect to 100 parts by mass of the base polymer (A).

(Other Additives)

In addition to the above-mentioned components, other additives may be added to the fluorine-containing elastomer composition.

In order to develop rubber elasticity, the insulating layer 12 is preferably formed from a crosslinked body produced by crosslinking the fluorine-containing elastomer composition. For example, in order to crosslink the insulating layer 12, a crosslinking agent or a crosslinking aid may be added to the fluorine-containing elastomer composition. As a crosslinking method, chemical crosslinking in which crosslinking is carried out by adding a crosslinking agent (organic peroxide, amines or the like) to the fluorine-containing elastomer composition and heating, irradiation crosslinking in which crosslinking is carried out by adding a crosslinking aid to the fluorine-containing elastomer composition and irradiating with ionizing radiation such as a gamma ray or an electron beam or the like can be mentioned. In the case of chemical crosslinking, from the viewpoint of suppressing residual ionic impurities after crosslinking, it is preferable to use an organic peroxide as the crosslinking agent, for example, peroxyketal, hydroperoxide, dialkyl peroxide, diacyl peroxide, peroxyester, peroxydicarbonate or the like may be used. Among them, dialkyl peroxide is particularly preferable from the viewpoint of reactivity. In the case of irradiation crosslinking, a crosslinking aid is preferably added, and it is preferable to use an allyl type compound such as triallylisocyanurate, triallyl cyanurate, triallyl trimellitate, tetraallyl pyromellitate or the like. One of these may be used alone, or two or more of them may be used in combination.

Also, for example, in order to improve the mechanical strength of the insulating layer 12, a filler may be added to the fluorine-containing elastomer composition. As the filler, an inorganic filler is preferable, and for example, silica, anhydrous silicic acid, magnesium silicate, aluminum silicate, calcium carbonate or the like can be used. The compounding amount of the inorganic filler is not particularly limited, but can be appropriately changed within a range that does not impair the advantageous effect of the present invention.

Also, for example, another inorganic filler, stabilizer, antioxidant, plasticizer, lubricant or the like may be blended into the fluorine-containing elastomer composition, if necessary. These may be blended within a range not to impair the properties of the fluorine-containing elastomer composition.

Incidentally, the fluorine-containing elastomer composition can be prepared by kneading the above mentioned components (a1), (a2), (b1) and (b2), and, if necessary, another additive with a kneader such as an open roll, a Banbury mixer, a pressure kneader or the like.

[Insulated Electric Wire]

Next, an insulated electric wire manufactured using the above-mentioned fluorine-containing elastomer composition will be described with reference to the drawings. FIG. 1 is a cross-sectional view perpendicular to a longitudinal direction of an insulated electric wire according to one embodiment of the present invention.

As shown in FIG. 1, the insulated electric wire 10 includes the conductor 11 and the insulating layer 12.

As the conductor 11, it is possible to use a metal wire typically used, for example, a copper wire, a copper alloy wire, an aluminum wire, a gold wire, a silver wire, or the like. Further, a metal wire plated with tin or nickel around the outer circumference of the metal wire may be used. Further, a stranded wire formed by stranding metal wires, for example, a collective stranded conductor can be used. The outer diameter of the conductor 11 is not particularly limited, hut may be appropriately changed in accordance with the electrical characteristics required for the insulated electric wire 10.

The insulating layer 12 is provided around the outer circumference of the conductor 11 so as to cover the conductor 11. The insulating layer 12 is formed of the fluorine-containing elastomer composition described above. For example, it is formed by extruding the fluorine-containing elastomer composition so as to cover the outer circumference of the conductor 11, molding and crosslinking the same. The thickness of the insulating layer 12 is not particularly limited, but may be appropriately changed according to the electrical characteristics required for the insulated electric wire 10.

As described above, the fluorine-containing elastomer composition for forming the insulating layer 12 includes the base polymer (A) including 70% by mass or more and 98% by, mass or less of a copolymer (a1) of tetrafluoroethylene and an α-olefin having 2 to 4 carbon atoms, and 2% by mass or more and 30% by mass or less of an ethylene-ethyl acrylate copolymer (a2), By mixing the component (a1) and the component (a2) at a predetermined ratio, a part of the more expensive component (a1) is replaced with the more inexpensive component (a2), and it is thereby possible to reduce the more expensive component (a1) content ratio to reduce the amount used. Thereby, the cost of the fluorine-containing elastomer composition can be reduced.

In this embodiment, by blending the predetermined amounts of the antimony compound (b1) and the bromine-based retardant (b2) as the flame retardant (B) in the base polymer (A), it is possible to complement the deterioration of the flame retardancy due to the decrease (decreased amount) in the content ratio of the component (a1) and improve the same.

As described above, according to the present embodiment, it is possible to produce the insulated electric wire 10 which is less expensive than the fluorine-containing elastomer composition in which its base polymer consists only of the fluorine-containing elastomer and which is excellent in mechanical properties, heat resistance and flame retardancy.

Specifically, the insulating layer 12 has such mechanical properties that its tensile strength is 10 MPa or more and that its elongation is 200% or more in an initial state (state before deterioration).

In addition, the insulating layer 12 is excellent in heat resistance, and is hardly deteriorated even when the insulated electric wire 10 is left in a high-temperature environment for a long period of time, and the insulating layer 12 can maintain high mechanical properties. Specifically, the insulating layer 12 has such a heat resistance that when it is heat-aged at 250 degrees C. for 4 days, its retention of tensile strength is 80% or more and its retention of elongation is 80% or more.

In addition, the insulating layer 12 has such a flame retardancy that it self-extinguishes within 1 minute when a vertical flame test in compliance with UL 758 is performed on the insulated electric wire 10.

EXAMPLES

Next, the present invention will be described in more detail based on examples, but the present invention is not limited to these examples.
Materials used in Examples and Comparative Examples are as follows.
Component (a1)
Tetrafluoroethylene-propylene copolymer: "Aflas 150 E" available from Asahi Glass Co., Ltd.
Component (a2)
Ethylene-ethyl acrylate copolymer: "NUC-6170" available from NUC
Ethylene-ethyl acrylate copolymer: "A1150" available from Japan Polyethylene Antimony Compound (b1)
Antimony trioxide ($Sb_2O_3$): available from China Twinkling Star
Bromine-Based Flame Retardant (b2)
Ethylene bis (pentabromobenzene): "Cyitex 8010" available from Albemarle Co., Ltd.
Other Additives
Crosslinking agent (organic peroxide; $\alpha,\alpha'$-di (tert-butylperoxide) diisopropylbenzene): "PERBUTYL P" available from NOF Corporation
Cross-linking aid (allyl type compound): "triallyl isocyanurate" available from Nippon Kasei Chemical. Co., Ltd.
Acid acceptor (Magnesium oxide): "Kyowa Mag 30" available from Kyowa Chemical Industry Co., Ltd.
Filler (silica): "Aerosil R-972" available from Nippon Aerosil Co., Ltd.
Filler (calcium carbonate): "Softon 1200" available from Shiraishi Kogyo Co., Ltd.

(1) Fabrication of the Insulated Electric Wire

Example 1

First, a fluorine-containing elastomer composition for terming an insulating layer was prepared with the formulation shown in Table 1 below. Specifically, the fluorine-containing elastomer composition of Example 1 was prepared by mixing 70% by mass of the tetrafluoroethylene-propylene copolymer which was the component (a1) and 30% by mass of the ethylene-ethyl acrylate copolymer (EA content 18%, MFR 6) which was the component (a2) to produce a base polymer (A), and adding to 100 parts by mass of the base polymer (A) 7 parts by mass of the antimony compound (b1), 10 parts by mass of the bromine-based flame retardant (b2), 2 parts by mass of the crosslinking agent (organic peroxide), 5 parts by mass of the crosslinking aid (allyl type compound), 1 part by mass of the acid acceptor (magnesium oxide), 10 parts by mass of the inorganic filler (silica), and 10 parts by mass of the inorganic filler (calcium carbonate) as the flame retardant (B), and kneading these with a roll.

Subsequently, the prepared fluorine-containing elastomer composition was extruded at a thickness of 0.4 ram around the outer circumference of a conductor (tin-plated copper stranded wire) having an outer diameter of 0.9 mm using a 40 mm extruder. Thereafter, crosslinking was carried out in steam at 13 atm for 3 minutes, and the insulating layer was crosslinked to produce an insulated electric wire of Example 1. Incidentally, in the 40 mm extruder, the cylinder temperature was set at 80 degrees C., the head temperature was set at 90 degrees C., and the die temperature was set at 100 degrees C., respectively.

TABLE 1

(Flame retardant (B) and other additives compounding amount unit is part by mass.)

| | | | | Example | | | | | Comparative example |
|---|---|---|---|---|---|---|---|---|---|
| | | | | 1 | 2 | 3 | 4 | 5 | 1 |
| Components | Base polymer (A) | (a1) component | Tetrafluoroethylene-propylene copolymer (mass %) | 70 | 90 | 98 | 90 | 90 | 60 |
| | | (a2) component | Ethylene-ethyl acrylate copolymer (EA 18%, MFR 6) (mass %) | 30 | 10 | 2 | 10 | 10 | 40 |

TABLE 1-continued (Flame retardant (B) and other additives compounding amount unit is part by mass.)

| | | | | Example 1 | Example 2 | Example 3 | Example 4 | Example 5 | Comparative Example 1 |
|---|---|---|---|---|---|---|---|---|---|
| | | | Ethylene-ethyl acrylate copolymer (EA 15%, MFR 0.8) (mass %) | | | | | 10 | |
| | Flame retardant (B) | Antimony compound (b1) component | Antimony trioxide (Sb$_2$O$_3$) | 7 | 7 | 7 | 3 | 3 | 7 |
| | | Bromine-based flame retardant (b2) component | Ethylene bis (pentabromobenzene) | 10 | 10 | 10 | 5 | 5 | 10 |
| | Other additives | Crosslinking agent | Organic peroxide | 2 | 2 | 2 | 2 | 2 | 2 |
| | | Crosslinking aid | Allyl type compound | 5 | 5 | 5 | 5 | 5 | 5 |
| | | Acid acceptor | Magnesium oxide | 1 | 1 | 1 | 1 | 1 | 1 |
| | | Filler | Silica | 10 | 10 | 19 | 10 | 10 | 10 |
| | | | Calcium carbonate | 10 | 10 | 10 | 10 | 10 | 10 |
| Evaluation | Tensile Properties | Tensile strength (MPa) | | 12.0 | 13.2 | 15.3 | 13.7 | 13.9 | 9.5 |
| | | Elongation (%) | | 270 | 340 | 380 | 360 | 350 | 198 |
| | Heat resistance | Retention of tensile strength (%) | | 89 | 105 | 111 | 106 | 104 | 78 |
| | | Retention of elongation (%) | | 90 | 112 | 118 | 116 | 117 | 78 |
| | Flame retardancy | VW-1 | | ○ | ○ | ○ | ○ | ○ | X |
| | Price | | | Inexpensive | Inexpensive | Inexpensive | Inexpensive | Inexpensive | Inexpensive |

| | | | | Comparative example 2 | 3 | 4 | 5 | 6 |
|---|---|---|---|---|---|---|---|---|
| Components | Base polymer (A) | (a1) component | Tetrafluoroethylene-propylene copolymer (mass %) | 100 | 80 | 80 | 90 | 80 |
| | | (a2) component | Ethylene-ethyl acrylate copolymer (EA 18%, MFR 6) (mass %) | | 20 | 20 | 10 | 20 |
| | | | Ethylene-ethyl acrylate copolymer (EA 15%, MFR 0.8) (mass %) | | | | | |
| | Flame retardant (B) | Antimony compound (b1) component | Antimony trioxide (Sb$_2$O$_3$) | 7 | | 12 | 7 | 7 |
| | | Bromine-based flame retardant (b2) component | Ethylene bis (pentabromobenzene) | 10 | 10 | 10 | | 20 |
| | Other additives | Crosslinking agent | Organic peroxide | 2 | 2 | 2 | 2 | 2 |
| | | Crosslinking aid | Allyl type compound | 5 | 5 | 5 | 5 | 5 |
| | | Acid acceptor | Magnesium oxide | 1 | 1 | 1 | 1 | 1 |
| | | Filler | Silica | 10 | 10 | 10 | 10 | 10 |
| | | | Calcium carbonate | 10 | 10 | 10 | 10 | 10 |
| Evaluation | Tensile Properties | Tensile strength (MPa) | | 15.7 | 11.3 | 10.8 | 12.3 | 11.3 |
| | | Elongation (%) | | 390 | 230 | 200 | 290 | 220 |
| | Heat resistance | Retention of tensile strength (%) | | 114 | 95 | 75 | 102 | 77 |
| | | Retention of elongation (%) | | 110 | 94 | 76 | 100 | 75 |
| | Flame retardancy | VW-1 | | ○ | X | ○ | X | ○ |
| | Price | | | Expensive | Inexpensive | Inexpensive | Inexpensive | Inexpensive |

Examples 2 and 3

In Examples 2 and 3, fluorine-containing elastomer compositions were prepared in the same manner as in Example 1 to produce insulated electric wires, except that the mixing ratios of the components (a1) and (a2) were changed.

Example 4

In Example 4, a fluorine-containing elastomer composition was prepared in the same manner as in Example 2 to produce an insulated electric wire, except that the blending amount of the antimony compound (b1) was reduced from 7 parts by mass to 3 parts by mass and the blending amount of the bromine-based flame retardant (b2) was reduced from 10 parts by mass to 5 parts by mass.

Example 5

In Example 5, a fluorine-containing elastomer composition was prepared in the same manner as in Example 4 to produce an insulated electric wire, except that the type of the component (a2) was changed.

Comparative Example 1

In Comparative Example 1, a fluorine-containing elastomer composition was prepared in the same manner as in Example 1 to produce an insulated electric wire, except that, with the component (a1) being 60% by mass and the component (a2) being 40%, the mixing ratio of the component (a1) and the component (a2) was outside the range specified in the present invention.

Comparative Example 2

In Comparative Example 2, a fluorine-containing elastomer composition was prepared in the same manner as in Example 1 to produce an insulated electric wire, except that no component (a2) was blended but only the component (a1) was used.

Comparative Example 3

In Comparative Example 3, a fluorine-containing elastomer composition was prepared in the same manner as in Example 1 to produce an insulated electric wire, except that after setting the mixing ratio of the components (a1) and (a2) at 80:20, only the bromine-based flame retardant (b2) was used without blending the antimony compound (b1).

Comparative Example 4

In Comparative Example 4, a fluorine-containing elastomer composition was prepared in the same manner as in Example 1 to produce an insulated electric wire, except that after setting the mixing ratio of the component (a1) and the component (a2) at 80:20, the blending amount of the antimony compound (b1) was increased from 7 parts by mass to 12 parts by mass, and set at outside the range defined by the present invention.

Comparative Example 5

In Comparative Example 5, a fluorine-containing elastomer composition was prepared in the same manner as in Example 1 to produce an insulated electric wire, except that after setting the mixing ratio of the components (a1) and (a2) at 90:10, only the antimony compound (b1) was used without blending the bromine-based retardant (b2).

Comparative Example 6

In Comparative Example 6, a fluorine-containing elastomer composition was prepared in the same manner as in Example 1 to produce an insulated electric wire, except that with the mixing ratio of the components (a1) and (a2) being 80:20, the blending amount of the bromine-based retardant (b2) was increased from 10 parts by mass to 20 parts by mass and was set at outside the range specified by the present invention.

(2) Evaluation Method

The insulated electric wire thus produced was evaluated by the following method.
(Tensile Properties)
Based on JISK6251 (2017), tensile properties were evaluated as mechanical properties in the initial state of the insulating layer. Specifically, the conductor was drawn out from the insulated electric wire to produce a tubular insulating layer, and the initial tensile properties (tensile strength and elongation) of this tubular insulating layer were measured. In these examples, when the tensile strength was 10 MPa or more and the elongation was 200% or more, this tubular insulating layer was evaluated as having sufficient mechanical properties.
(Heat Resistance)
Regarding the heat resistance of the insulating layer, the tubular insulating layer produced by drawing out the conductor from the insulated electric wire was aged (deteriorated) by heating, and the degree of deterioration was evaluated. Specifically, the tube-shaped insulating layer was put into a heat aging tester and deteriorated at 250 degrees C. for 4 days, and its tensile properties (tensile strength and elongation) after heat aging were measured. Then, as shown in the following formula, the retentions of the tensile properties (retention of tensile strength (%) and retention of elongation (%)) after heat aging against the initial tensile properties were calculated. In these examples, if both the retention of tensile strength (%) and the retention of elongation (%) were 80% or more, the insulating layer was evaluated as having sufficient heat resistance, or if the retentions of these were less than 80%, the insulating layer was excessively deteriorated by heating and it was evaluated as having insufficient heat resistance.

Retention of tensile strength (%)=(tensile strength after heat aging/tensile strength in the initial state)×100

Retention of elongation (%)=(elongation after heat aging/elongation in the initial state)×100

(Flame Retardancy)
With regard to the flame retardancy of the insulating layer, a vertical flame test (VW-1) was conducted in compliance with UL 758, those which self-extinguished within 1 minute were accepted or those exceeding 1 minute were rejected.
(Price)
With regard to the price, in the base polymer (A) including the more expensive component (a1) and the more inexpensive component (a2), those having a content ratio of the component (a2) to the base polymer (A) (if 2% or more were evaluated as inexpensive.

(3) Evaluation Results

The evaluation results were summarized in Table 1 above.
In Examples 1 to 5, in the insulating layers, while the inexpensive (a2) component was mixed with the expensive (a1) component at a predetermined ratio to reduce the cost, it was confirmed that the mechanical properties, the heat resistance and the flame retardancy inherent in the component (a1) were not impaired but able to be maintained high.
On the other hand, in Comparative Example 1, it was confirmed that the mechanical properties and the heat resistance were not able to be maintained high because the ratio of the inexpensive (a2) component was increased too much.
In Comparative Example 2, since only the component (a1) was used, it was confirmed that the various properties were able to be satisfied in a balanced manner at a high level, but the cost was high.
In Comparative Examples 3 and 5, it was confirmed that no sufficient flame retardancy was able to be obtained because the antimony compound (b1) and the bromine-based flame retardant (b2) were not used in combination but only either one of them was used.
In Comparative Examples 4 and 6, since the blending amount of either one of the antimony compound (b1) and the bromine-based flame retardant (b2) was excessively increased, it was confirmed that although the sufficient flame retardancy was obtained, the heat resistance was impaired.
As described above, according to the present invention, by using a copolymer (a1) of tetrafluoroethylene and an α-olefin having 2 to 4 carbon atoms in combination with a relatively inexpensive ethylene-ethyl acrylate copolymer (a2), and by blending the predetermined amounts of the antimony compound (b1) and the bromine-based flame retardant (b2), it is possible to not impair but maintain the high mechanical properties, heat resistance and flame retardancy inherent in the component (a1) even while reducing the cost.

PREFERRED EMBODIMENTS OF THE PRESENT INVENTION

The preferred embodiments of the present invention will be described below.

[Supplementary Note 1]

According to one aspect of the present invention, there is provided an insulated electric wire, comprising: a conductor; and an insulating layer disposed around an outer circumference of the conductor, wherein the insulating layer is formed from a fluorine-containing elastomer composition, and the fluorine-containing elastomer composition includes a base polymer (A) including 70% by mass or more and 98% by mass or less of a copolymer (a1) of tetrafluoroethylene and an α-olefin having 2 to 4 carbon atoms, and 2% by mass or more and 30% by mass or less of an ethylene-ethyl acrylate copolymer (a2) (excluding an ethylene-ethyl acrylate-maleic anhydride ternary copolymer), and a flame retardant (B) including an antimony compound (b1) and a bromine-based flame retardant (b2), and including 1 part by mass or more and 9 parts by mass or less of the antimony compound (b1), and 0.3 parts by mass or more and 15 parts by mass or less of the bromine-based flame retardant (b2) per 100 parts by mass of the base polymer (A).

[Supplementary Note 2]

In the insulated electric wire according to Supplementary Note 1, preferably, the copolymer (a1) is a tetrafluoroethylene-propylene copolymer.

[Supplementary Note 3]

In the insulated electric wire according to any one of Supplementary Notes 1 and 2, preferably, the bromine-based flame retardant (b2) is ethylene bis (pentabromobenzene).

[Supplementary Note 4]

In the insulated electric wire according to Supplementary Note 1, preferably, the insulating layer is formed of a crosslinked body produced by crosslinking the fluorine-containing elastomer composition.

[Supplementary Note 5]

In the insulated electric wire according to Supplementary Note 1 or 4, it is preferable that the insulating layer has such mechanical properties that its tensile strength is 10 MPa or more and its elongation is 200% or more, such a heat resistance that when it is heat-aged at 250 degrees C. for 4 days, its retention of tensile strength is 80% or more and its retention of elongation is 80% or more, and such a flame retardancy that it self-extinguishes within 1 minute when the vertical flame test in compliance with UL 758 is performed.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An insulated electric wire, comprising:
a conductor; and
an insulating layer disposed around an outer circumference of the conductor,
wherein the insulating layer is formed from a fluorine-containing elastomer composition, and the fluorine-containing elastomer composition includes a base polymer (A) including 70% by mass or more and 98% by mass or less of a tetrafluoroethylene-propylene copolymer (a1), and 2% by mass or more and 30% by mass or less of an ethylene-ethyl acrylate copolymer (a2) (excluding an ethylene-ethyl acrylate-maleic anhydride ternary copolymer), and a flame retardant (B) including an antimony compound (b1) and a bromine-based flame retardant (b2), and including 1 part by mass or more and 9 parts by mass or less of the antimony compound (b1), and 0.3 parts by mass or more and 15 parts by mass or less of the bromine-based flame retardant (b2) per 100 parts by mass of the base polymer (A), and
wherein the tetrafluoroethylene-propylene copolymer (a1) comprises tetrafluoroethylene and propylene at a molar ratio in a range from 95:5 to 30:70, and
wherein a content of the antimony compound (b1) is in a range from 3 parts by mass or more to 7 parts by mass or less with respect to 100 parts by mass of the base polymer (A).

2. The insulated electric wire according to claim 1, wherein the bromine-based flame retardant (b2) comprises ethylene bis (pentabromobenzene).

3. The insulated electric wire according to claim 1, wherein the insulating layer is formed from a crosslinked body produced by crosslinking the fluorine-containing elastomer composition.

4. The insulated electric wire according to claim 3, wherein the insulating layer has such mechanical properties that a tensile strength of the insulating layer is 10 MPa or more and an elongation of the insulating layer is 200% or more, such a heat resistance that, when the insulating layer is heat-aged at 250 degrees C. tier 4 days, a retention of tensile strength of the insulating layer is 80% or more and the retention of elongation of the insulating layer is 80% or more, and such a flame retardancy that the insulating layer self-extinguishes within 1 minute when a vertical flame test in compliance with UL 758 is performed.

5. The insulated electric wire according to claim 1, wherein the insulating layer has such mechanical properties that a tensile strength of the insulating layer is 10 MPa or more and an elongation of the insulating layer is 200% or more, such a heat resistance that, when the insulating layer is heat-aged at 250 degrees C. for 4 days, a retention of tensile strength of the insulating layer is 80% or more and the retention of elongation of the insulating layer is 80% or more, and such a flame retardancy that the insulating layer self-extinguishes within 1 minute when a vertical flame test in compliance with UL 758 is performed.

6. The insulated electric wire according to claim 4, wherein the insulating layer has a heat resistance that, when the insulating layer is heat-aged at 250 degrees C. for 4 days, a retention of tensile strength of the insulating layer is 80% or more and a retention of elongation of the insulating layer is 80% or more.

7. The insulated electric wire according to claim 6, wherein the tetrafluoroethylene-propylene copolymer (a1) has a number average molecular weight in a range from 20,000 to 200,000.

8. The insulated electric wire according to claim 6, wherein a content of the ethyl acrylate in the ethylene-ethyl acrylate copolymer (a2) is 15% by mass or more and 18% by mass or less.

9. The insulated electric wire according to claim 6, wherein the tetrafluoroethylene-propylene copolymer (a1) comprises tetrafluoroethylene and propylene at a molar ratio in a range from 90:10 to 45:55.

10. The insulated electric wire according to claim 6, wherein the fluorine-containing elastomer composition includes the base polymer (A) including 70% by mass or more and 90% by mass or less of the tetrafluoroethylene-propylene copolymer (a1), and 2% by mass or more and 10% by mass or less of the ethylene-ethyl acrylate copolymer (a2) (excluding the ethylene-ethyl acrylate-maleic anhydride ternary copolymer).

11. The insulated electric wire according to claim 4, wherein the tetrafluoroethylene-propylene copolymer (a1) has a number average molecular weight in a range from 20,000 to 200,000.

12. The insulated electric wire according to claim 4, wherein a content of the ethyl acrylate in the ethylene-ethyl acrylate copolymer (a2) is 15% by mass or more and 18% by mass or less.

13. The insulated electric wire according to claim 4, wherein the tetrafluoroethylene-propylene copolymer (a1) comprises tetrafluoroethylene and propylene at a molar ratio in a range from 90:10 to 45:55.

14. The insulated electric wire according to claim 4, wherein the fluorine-containing elastomer composition includes the base polymer (A) including 70% by mass or more and 90% by mass or less of the tetrafluoroethylene-propylene copolymer (a1), and 2% by mass or more and 10% by mass or less of the ethylene-ethyl acrylate copolymer (a2) (excluding the ethylene-ethyl acrylate-maleic anhydride ternary copolymer).

15. The insulated electric wire according to claim 4, wherein the base polymer (A) further includes an ethylene-vinyl acetate copolymer.

16. The insulated electric wire according to claim 4, wherein the antimony compound (b1) comprises diantimony trioxide.

17. The insulated electric wire according to claim 4, wherein a content of the bromine-based flame retardant (b2) is in a range from 5 parts by mass or more to 10 parts by mass or less with respect to 100 parts by mass of the base polymer (A).

* * * * *